June 2, 1925.

E. A. POHLMAN ET AL 1,540,497

COMBINED VEHICLE RAISING AND RIM JACK AND HUB CAP WRENCH

Filed May 3, 1924

Inventors

EDWARD A. POHLMAN
JAMES LOVELL

By A. B. Bowman

Attorney

Patented June 2, 1925.

1,540,497

UNITED STATES PATENT OFFICE.

EDWARD A. POHLMAN AND JAMES LOVELL, OF SAN DIEGO, CALIFORNIA.

COMBINED VEHICLE RAISING AND RIM-JACK AND HUB-CAP WRENCH.

Application filed May 3, 1924. Serial No. 710,951.

*To all whom it may concern:*

Be it known that we, EDWARD A. POHLMAN and JAMES LOVELL, citizens of the United States, residing at San Diego, in the county of San Diego and State of California, have invented certain new and useful Combined Vehicle Raising and Rim-Jack and Hub-Cap Wrenches, of which the following is a specification.

Our invention relates to a combination vehicle raising and tire rim separating jack and hub cap wrench, and the objects of our invention are: First, to provide a device of this class which is provided at its ends with mutually separable end members adapted for raising a vehicle frame, which members are provided at their sides with pivotally mounted tire rim engaging hook members adapted to engage the outer edges of a tire rim near the separated portion thereof for separating and contracting the tire rim as desired; second, to provide a tire rim separating and contracting device which is provided with mutually separable end members having on their one sides only, pivotally mounted tire rim engaging hook members for positively gripping the tire rim at its separated portions; third, to provide a device of this class which is provided at one end with a shiftable end member having an inwardly extending notched recess adapted to receive the axle of a vehicle when using the device as a raising jack, which notched recess portion serves as a wrench for removing hub caps from vehicle axles; fourth, to provide a device of this class which is provided with a screw having different hand threads at its opposite ends for simultaneously separating or contracting the members positioned at the ends thereof; fifth, to provide a novel means for rotating said screw; sixth, to provide as a whole a novelly constructed combination device of this class; and seventh, to provide such a device which is very simple and economical of construction, durable, practical, and which will not readily deteriorate or get out of order.

Figure 1:
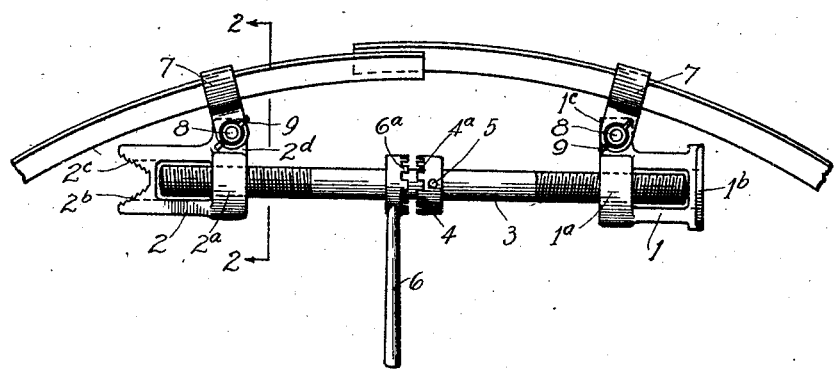
Figure 2:
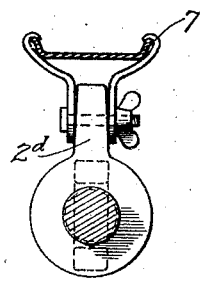
Figure 3:
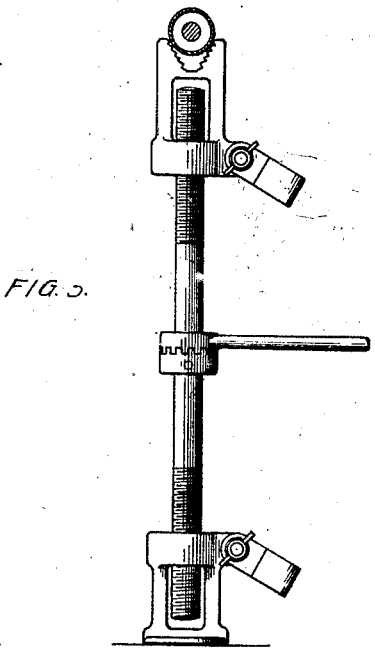
Figure 4:
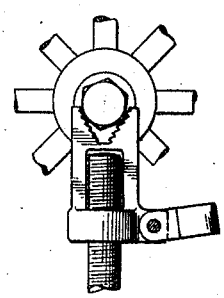

With these and other objects in view, as will appear hereinafter, our invention consists of certain novel features of construction, combination, and arrangement of parts and portions, as will be hereinafter described in detail and particularly set forth in the appended claims, reference being had to the accompanying drawings and to the characters of reference thereon, which form a part of this application, in which:

Figure 1 is a side view of our combination device applied to a tire rim at the separated portions thereof, for separating or contracting the same; Fig. 2 is an enlarged sectional view thereof, taken through 2—2 of Fig. 1; Fig. 3 is a side elevational view of our combination device used as a jack for raising the axle of a vehicle, and Fig. 4 is a fragmentary view thereof, showing the one end of the device used as a wrench for removing a hub cap.

Like characters of reference refer to similar parts and portions throughout the several views of the drawings.

The base member 1, head member 2, screw 3, clutch member 4, pin 5, clutch handle member 6, tire rim gripping members 7, bolts 8, and the wing nuts 9, constitute the principal parts and portions of our combination device.

The base member 1 and the head member 2 are each preferably cast or otherwise formed in one piece and are provided at their adjacent portions with enlarged portions $1^a$ and $2^a$, respectively, which are internally threaded to receive the opposite ends of the screw 3. Said members 1 and 2 are preferably bridged between their inner and outer ends to reduce the weight of the same. The opposite ends of the screw 3 are provided, respectively, with left and right-hand threads, so that the members 1 and 2 may be mutually separated or contracted at a greater speed, to reduce the cost of construction and also to reduce the length of the end members 1 and 2. The base member 1 is preferably provided with an enlarged base portion $1^b$ so that the same may be firmly positioned on the ground when using the device as a lifting jack. The extended end of the head member 2 is provided with an inwardly extending recess portion $2^b$, the sides of which are inclined at an angle with each other and are provided with teeth or notches $2^c$. Said notched recess portion of the member 2 is adapted to retain the axle of the vehicle when the same is used as a lifting-jack, and is adapted to serve as a wrench for removing the hub cap of the vehicle axle. It will be noted that there is provided a hole through the whole of the end members 1 and 2 so as to provide for greater adjustment of the screw relatively thereto, Intermediate the ends of the screw 3 is secured a clutch member 4, preferably by means of a pin 5. Said clutch member is provided on one side with a plurality of notches 4ª, which are adapted to receive correspondingly shaped teeth 6ª on the adjacent side of the clutch handle member 6, which clutch handle member is reciprocally mounted on the screw 3 at the middle portion thereof. When desiring to rotate the screw, the teeth of the handle member 6 are shifted into engagement with the teeth of the clutch member 4.

Both of the members 1 and 2 are provided near their adjacent ends with laterally extending lugs 1ᶜ and 2ᵈ, respectively. On each side of said lugs are pivotally mounted the tire rim gripping members 7, the pivotal axes of said gripping members being at a right angle to the axis of the screw 3. The gripping members 7 are pivotally connected with the lugs on the members 1 and 2 by means of bolts 8 extending through said members and said lugs. The threaded ends of the bolts 8 are provided with wing nuts 9 for readily securing said gripping members in certain positions. The outer ends of the gripping members 7 are provided with hook portions 7ª, which are adapted to engage and grip the outwardly turned edges of the conventional separable tire rim, as shown best in Fig. 2 of the drawings. Said gripping members are turned outwardly in curved form from the portions secured to the lugs of the members 1 and 2, which outwardly curved portions are adapted to extend around the inner and side portions of the tire rim, at the outer ends of which curved portions are secured the hook portions 7ª.

It is obvious from this construction, as illustrated in the drawings and disclosed in the foregoing specification, that there is provided a combination tire-rim engaging device and lifting-jack and hub-cap wrench as aimed at and set forth in the objects of the invention, and though we have shown and described a particular construction, combination, and arrangement of parts and portions, we do not wish to be limited to this particular construction, combination, and arrangement, but desire to include in the scope of our invention the construction, combination, and arrangement substantially as set forth in the appended claims.

Having thus described our invention, what we claim as new and desire to secure by Letters Patent, is:

1. In a device of the class described, a pair of mutually shiftable end members, a screw means connecting said end members with each other and adapted to shift the same relatively to each other, and a pair of oppositely disposed gripping members pivotally mounted on one side of each of said end members, the pivotal axes of said gripping members being positioned from the outer ends of said end members a distance greater than the length of said gripping members.

2. In a device of the class described, a base member and a head member, a raising screw provided with opposite hand threads at its opposite ends extending into the adjacent ends of said base and said head members, notched clutch means for rotating said screw, and a pair of oppositely disposed laterally extending tire rim gripping members pivotally mounted on the one side of each of said base and said head members, the pivotal axes of said gripping members being positioned from the outer ends of said base and head members a distance greater than the length of said gripping members.

3. In a device of the class described, a base member, a head member provided with an inwardly extending recess at its normally upper end, a screw extending into and revolubly mounted in each of said base and said head members for mutually separating the same, and a pair of oppositely disposed outwardly extending tire rim gripping members pivotally mounted on each of said base and said head members, the pivotal axes of said gripping members being positioned a considerable distance from the normally lower and upper ends of the respective base and head members.

4. In a device of the class described, a base member, a head member provided with an inwardly extending recess at its normally upper end, a screw extending into and revolubly mounted in each of said base and said head members for mutually separating the same, a pair of oppositely disposed outwardly extending tire rim gripping members pivotally mounted on each of said base and said head members, the pivotal axes of said gripping members being positioned a considerable distance from the normally lower and upper ends of the respective base and head members, and thumb-screw means for adjustably securing said gripping members in certain positions.

In testimony whereof, we have hereunto set our hands at San Diego, California, this 26th day of April, 1924.

EDWARD A. POHLMAN.
JAMES LOVELL.